(12) United States Patent
Nakagomi

(10) Patent No.: US 8,411,911 B2
(45) Date of Patent: Apr. 2, 2013

(54) IMAGE PROCESSING APPARATUS, IMAGE PROCESSING METHOD, AND STORAGE MEDIUM FOR STORING PROGRAM

(75) Inventor: Kouichi Nakagomi, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 645 days.

(21) Appl. No.: 12/624,743

(22) Filed: Nov. 24, 2009

(65) Prior Publication Data

US 2010/0135532 A1    Jun. 3, 2010

(30) Foreign Application Priority Data

Nov. 28, 2008  (JP) ................................ 2008-303706
Oct. 21, 2009  (JP) ................................ 2009-242517

(51) Int. Cl.
  *G06K 9/00*  (2006.01)
  *G06K 9/40*  (2006.01)
  *G06K 9/36*  (2006.01)
(52) U.S. Cl. ...... 382/118; 382/266; 382/276; 348/222.1
(58) Field of Classification Search ............. 382/103, 382/266, 276; 348/E5.031, 222.1
  See application file for complete search history.

(56) References Cited

U.S. PATENT DOCUMENTS

| 6,885,761 | B2 | 4/2005 | Kage | |
| 2002/0070945 | A1* | 6/2002 | Kage | 345/581 |
| 2002/0150280 | A1* | 10/2002 | Li | 382/117 |
| 2003/0095701 | A1* | 5/2003 | Shum et al. | 382/155 |
| 2008/0240610 | A1 | 10/2008 | Hayaishi | |

FOREIGN PATENT DOCUMENTS

| CN | 1794265 A | 6/2006 |
| EP | 1 589 476 A1 | 10/2005 |
| JP | 2001-209817 A | 8/2001 |
| JP | 2002-175538 A | 6/2002 |
| JP | 2004-264893 A | 9/2004 |
| JP | 2004-318204 A | 11/2004 |
| JP | 2005-277772 A | 10/2005 |
| JP | 2007-272435 A | 10/2007 |
| JP | 2008-242912 A | 10/2008 |
| JP | 2008-250398 A | 10/2008 |

OTHER PUBLICATIONS

European Search Report dated Mar. 26, 2010 issued in counterpart European Application No. 09177131.1-2218.
Japanese Office Action dated Apr. 19, 2011 (and English translation thereof) in counterpart Japanese Application No. 2009-242517.
Japanese Office Action dated Dec. 21, 2010 (and English translation thereof) in counterpart Japanese Application No. 2009-242517.
Chinese Office Action dated Nov. 9, 2012 (and English translation thereof) in counterpart Chinese Application No. 200910266600.1.

* cited by examiner

*Primary Examiner* — Aaron W Carter
(74) *Attorney, Agent, or Firm* — Holtz, Holtz, Goodman & Chick, P.C.

(57) ABSTRACT

An image processing apparatus comprises an image capture unit configured to capture an image, a characteristic part detector configured to detect a characteristic part of a face from the image captured by the image capture unit, an outline generator configured to generate a pseudo outline of the face based on positions of the characteristic part detected by the characteristic part detector and a correction unit configured to correct the image based on the pseudo outline generated by the outline generator.

12 Claims, 7 Drawing Sheets

MOVING-DISTANCE MAP

Map (x, y) = (1.4, 0)

ENTERED IMAGE

OUTPUT IMAGE

MOVE BY 1.4 PIXELS IN x DIRECTION

IMAGE PROCESSING APPARATUS, IMAGE PROCESSING METHOD, AND STORAGE MEDIUM FOR STORING PROGRAM

CROSS-REFERENCE TO RELATED APPLICATIONS

This application is based upon and claims the benefit of priority from prior Japanese Patent Applications No. 2008-303706, filed Nov. 28, 2008; and No. 2009-242517, filed Oct. 21, 2009, the entire contents of both of which are incorporated herein by reference.

BACKGROUND OF THE INVENTION

1. Field of the Invention

The present invention relates to an image processing apparatus, an image processing method, and a storage medium for storing a program, which correct a captured face image.

2. Description of the Related Art

Jpn. Pat. Appln. KOKAI Publication No. 2008-242912 discloses a printer which corrects a portion corresponding to a face in an entered image. Jpn. Pat. KOKAI Publication No. 2005-277772 discloses a photo-sticker printing machine which captures image data of a subject person and corrects the image data.

However, when correcting the image data to enlarge an eye of the subject person or to slim a face outline of the subject person in the image with the printer or the photo-sticker printing machine, a user (or the subject person) should designate an area to be corrected by operating a touch pen or the like; thus, burdensome work is required.

BRIEF SUMMARY OF THE INVENTION

It is an object of the invention to provide an image processing apparatus, an image processing method, and a storage medium for storing a program, which can readily correct a face image.

According to an embodiment of the present invention, an image processing apparatus comprises:

an image capture unit configured to capture an image;

a characteristic part detector configured to detect a characteristic part of a face from the image captured by the image capture unit;

an outline generator configured to generate a pseudo outline of the face based on positions of the characteristic part detected by the characteristic part detector; and a correction unit configured to correct the image based on the pseudo outline generated by the outline generator.

According to another embodiment of the present invention, an image processing method comprises:

capturing an image;

detecting a characteristic part of a face from the image;

generating a pseudo outline of the face based on the characteristic part; and correcting the image based on the pseudo outline.

According to another embodiment of the present invention, a storage medium having stored thereon a computer readable program for enabling a computer for causing an image processing apparatus which comprises an image capture unit configured to capture an image, the program comprises:

code means for enabling the computer to detect a characteristic part of a face from the image;

code means for enabling the computer to generate a pseudo outline of the face based on the characteristic part; and code means for enabling the computer to correct the image based on the pseudo outline.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention and, together with the general description given above and the detailed description of the embodiments given below, serve to explain the principles of the invention in which.

DETAILED DESCRIPTION OF THE INVENTION

Hereinafter, embodiments of a digital camera which represents an example of an image capture apparatus according to the present invention will be described with reference to the accompanying drawings.

Embodiment

An embodiment of the present invention will now be described in detail with reference to the accompanying drawings; however, the scope of the invention is not limited to the illustrated embodiment.

Figure 1:
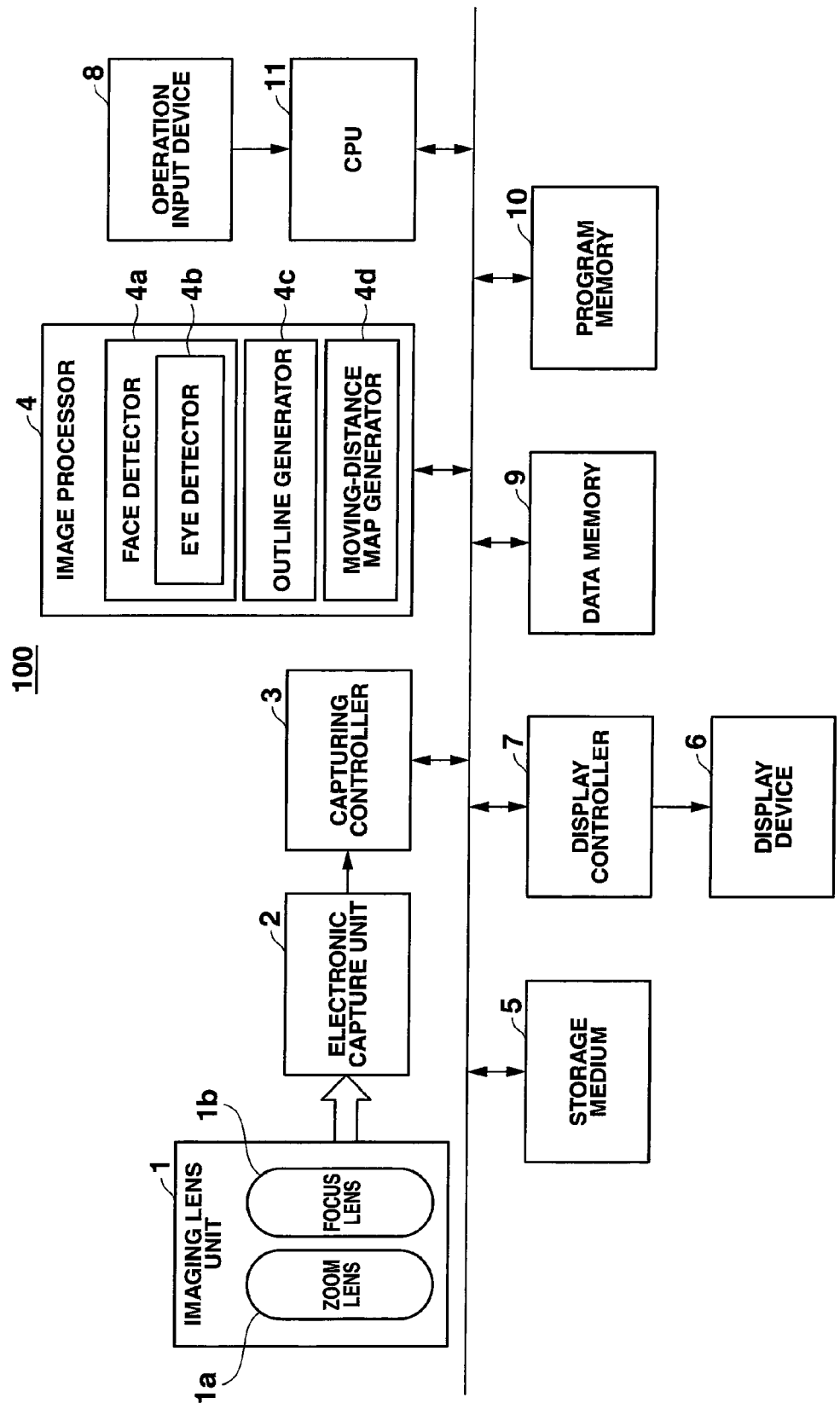
FIG. 1 is a block diagram showing a schematic configuration of an image capture apparatus according to an embodiment.

FIG. 1 is a block diagram showing a schematic configuration of an image capture apparatus 100 to which the present embodiment is applied.

The image capture apparatus 100 captures a face image, detects a characteristic portion in the face image, generates a pseudo outline L1 of the face based on the characteristic portion, and corrects the face image based on the pseudo outline L1.

As shown in FIG. 1, the image capture apparatus 100 includes an imaging lens unit 1, an electronic capture unit 2, a capturing controller 3, an image processor 4, a storage medium 5, a display device 6, a display controller 7, an operation input device 8, a data memory 9, a program memory 10 and a CPU 11.

The imaging lens unit 1 includes a plurality of lenses such as a zoom lens 1a and a focus lens 1b. The imaging lens unit 1 includes a zoom driver (not shown) which moves the zoom lens 1a along an optical axis and a focus driver (not shown) which drives the focus lens 1b along the optical axis.

The electronic capture unit 2 captures an image of a subject and generates image data of a face of the subject. The electronic capture unit 2 includes an imaging element such as a charge coupled device (CCD) or a complementary metal-oxide semiconductor (CMOS) image sensor. The electronic capture unit 2 converts an optical image of the subject transmitting from the lenses of the imaging lens unit 1 into a two-dimensional image signal.

The capturing controller 3 includes a timing generator and a vertical driver, which are not shown. The capturing controller 3 causes the timing generator and the vertical driver to drive sweeping of the electronic capture unit 2 for converting the image of the subject into the two-dimensional image signal at given intervals. The capturing controller 3 receives the image (frame) of one screen from an image-capture range of the electronic capture unit 2 and outputs the image (frame) to the image processor 4.

The imaging lens unit 1, the electronic capture unit 2 and the capturing controller 3 function as means for capturing image data.

The capturing controller 3 controls automatic exposure processing, automatic focus processing, automatic white balance processing and the like.

The image processor 4 executes image processing such as image quality adjustment, resolution conversion, and image compression based on the frame transferred from the capturing controller 3 and generates image data to be displayed or image data to be recorded. The image processor 4 executes gain adjustment on the transferred frame which is in an analog signal state for each of RGB components. Then, a sample holding circuit (not shown) executes sample holding on the frame, an analog to digital converter (not shown) converts the frame into digital data, and a color process circuit (not shown) executes color processing including pixel interpolation and gamma correction. Thereafter, a digital luminance signal Y and digital color difference signals Cr and Cb are generated.

The luminance signal Y and the color difference signals Cr and Cb are transferred to the data memory 9 via a digital memory access (DMA) controller (not shown).

The image processor 4 includes a face detector 4a which detects a face image area from the frame transferred from the capturing controller 3 under the control of the CPU 11 using a predetermined face detection method.

The face detector 4a detects the face image area from the frame and detects a characteristic face part, e.g., an eye, a nose, or a mouth from the detected face image area. The face detection method is known in the art and its detailed description will be omitted.

The CPU 11 and the face detector 4a function as means for detecting a characteristic part from the face image in the frame generated by the electronic capture unit 2 and the capturing controller 3.

The face detector 4a includes an eye detector 4b which detects eyes from the face image area under the control of the CPU 11.

Figure 2:
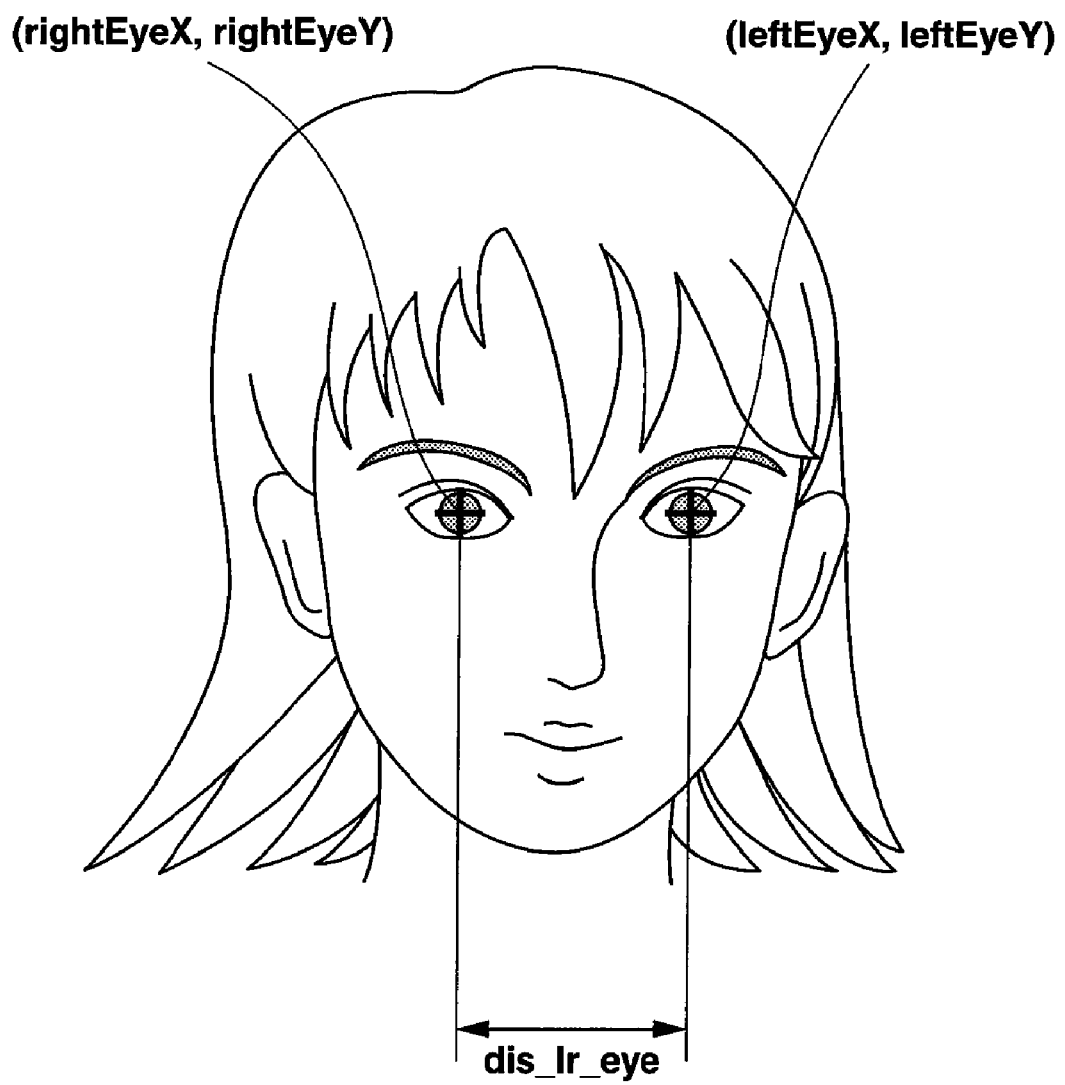
FIG. 2 is a view for explaining an example of eye detection.

The eye detector 4b calculates coordinates (rightEyeX, rightEyeY) and (leftEyeX, leftEyeY) which respectively denote centers of right and left eyes (e.g., centers of pupils) detected from the face (see FIG. 2).

The CPU 11 and the eye detector 4b function as means for detecting the eyes from the face image.

The image processor 4 includes an outline generator 4c which generates a pseudo outline L1 of the face under the control of the CPU 11.

The outline generator 4c generates the pseudo outline L1, which is expected to be an outline of the face, based on the position coordinates (rightEyeX, rightEyeY) and (leftEyeX, leftEyeY) of the right and left eyes detected as the characteristic parts by the eye detector 4b. The outline generator 4c calculates inclination of the face and a distance between the right and left eyes based on the position coordinates. The pseudo outline L1 is generated from the calculation result. The outline generator 4c calculates an inclination angle of the face towards x direction based on expression (1) shown below (see FIG. 3A). In the expression (1), delta_x denotes a distance between the right and left eyes in x direction and delta_y denotes a distance between the eyes in y direction.

$$\theta = \arctan(\text{abs}(\text{delta}\_x), \text{abs}(\text{delta}\_y)) \quad (1)$$

Regarding the expression (1), delta_x is derived from "rightEyeX−leftEyeX" and delta_y is derived from "rightEyeY−leftEyeY".

The outline generator 4c calculates a distance "dis_lr_eye" between the right and left eyes from expression (2) using delta_x and delta_y (see FIG. 2).

$$\text{dis\_lr\_eye} = \text{sqrt}(\text{delta}\_x^2 + \text{delta}\_y^2) \quad (2)$$

Figure 3A:
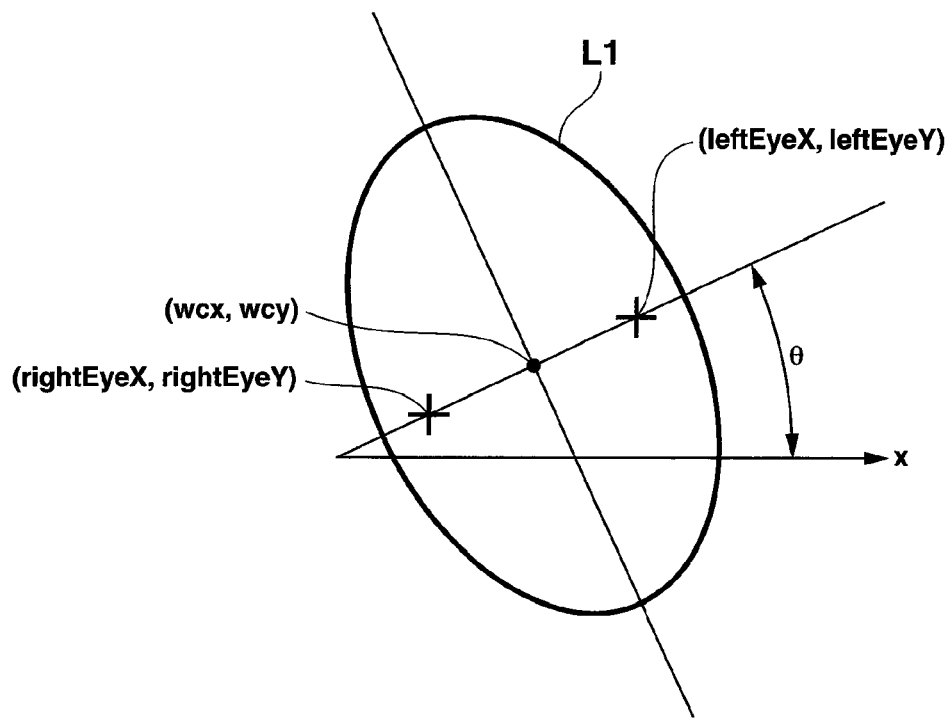
FIGS. 3A and 3B show examples of pseudo outline.

The outline generator 4c derives the pseudo outline L1 from expression (3) based on coordinates (wcx, wcy) of a middle point between the right and left eyes, the inclination angle θ and distance dis_lr_eye, under the assumption that the pseudo outline L1 will be formed as an ellipse (see FIG. 3A).

$$L1 = \frac{(w-wcx)*\cos\theta + (y-wcy)*\sin\theta}{b} * \frac{(x-wcx)*\cos\theta + (y-wcy)*\sin\theta}{b} + \frac{-(x-wcx)*\sin\theta + (y-wcy)*\cos\theta}{a} * \frac{-(x-wcx)*\sin\theta + (y-wcy)*\cos\theta}{a} \quad (3)$$

In the expression (3), "a" is equivalent to the distance "dis_lr_eye" between the right and left eyes.

The CPU 11 and the outline generator 4c function as means for generating the pseudo outline L1 of the face based on the characteristic part(s) (the eyes, for example) detected by the face detector 4a.

The image processor 4 corrects the face image based on the pseudo outline L1 under the control of the CPU 11. The image processor 4 executes warp processing which transforms an area below the right and left eyes in the face based on the pseudo outline L1.

The image processor 4 includes a moving-distance map generator 4d. The moving-distance map generator 4d calculates a distance between the pseudo outline L1 and a pixel in the face image, and based on the calculated distance, generates a moving-distance map, i.e. map (x, y), which defines a moving distance for the pixel to be moved in the warp processing.

The moving-distance map, map (x, y), is set to have the same size as the frame which is transferred from the capturing controller, for example, 640×480 pixels in VGA size. The moving-distance map defines moving distances for each pixel in x and y directions. In the present embodiment, the moving-distance map defining a moving distance for each pixel in x direction is generated to decrease a calculation amount and to accelerate the processing.

Figure 4A:
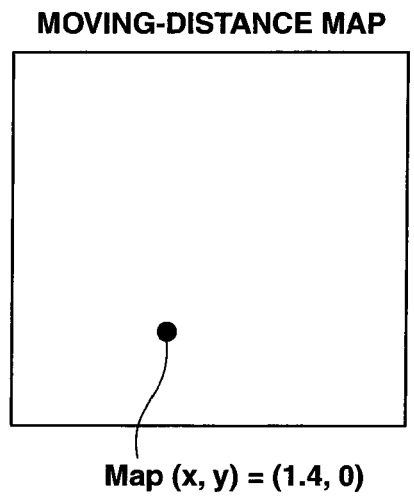
FIGS. 4A, 4B and 4C are views for explaining image correction processing.
Figure 4B:
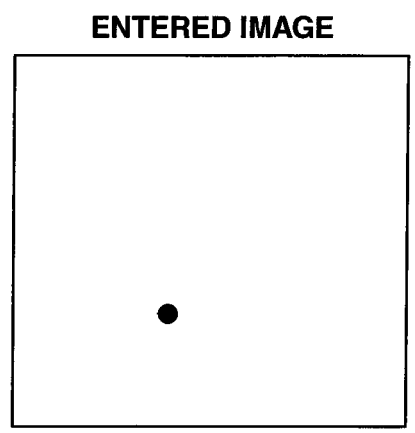
Figure 4C:
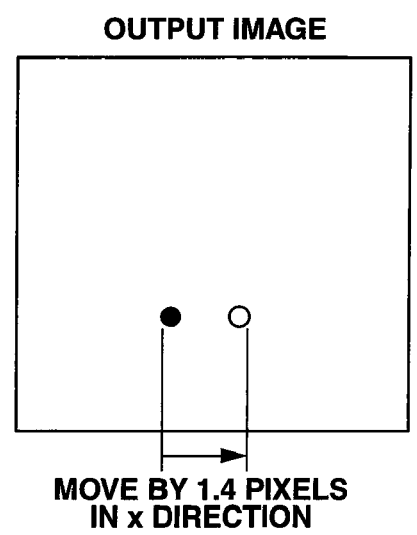

In the warp processing, each pixel in the image (see FIG. 4B) is moved based on the moving-distance map (x, y) (see FIG. 4A), and a desired output image (see FIG. 4C) is provided. For example, as shown in FIG. 4A, a moving distance for one pixel in the moving-distance map (denoted by a dot in the drawing) is defined by map (x, y)=(1.4, 0). A corresponding pixel in the image (see FIG. 4B) is moved by 1.4 pixel in x direction based on map (x, y)=(1.4, 0) to present a pixel in the output image (denoted by a white dot in FIG. 4C).

Figure 5:
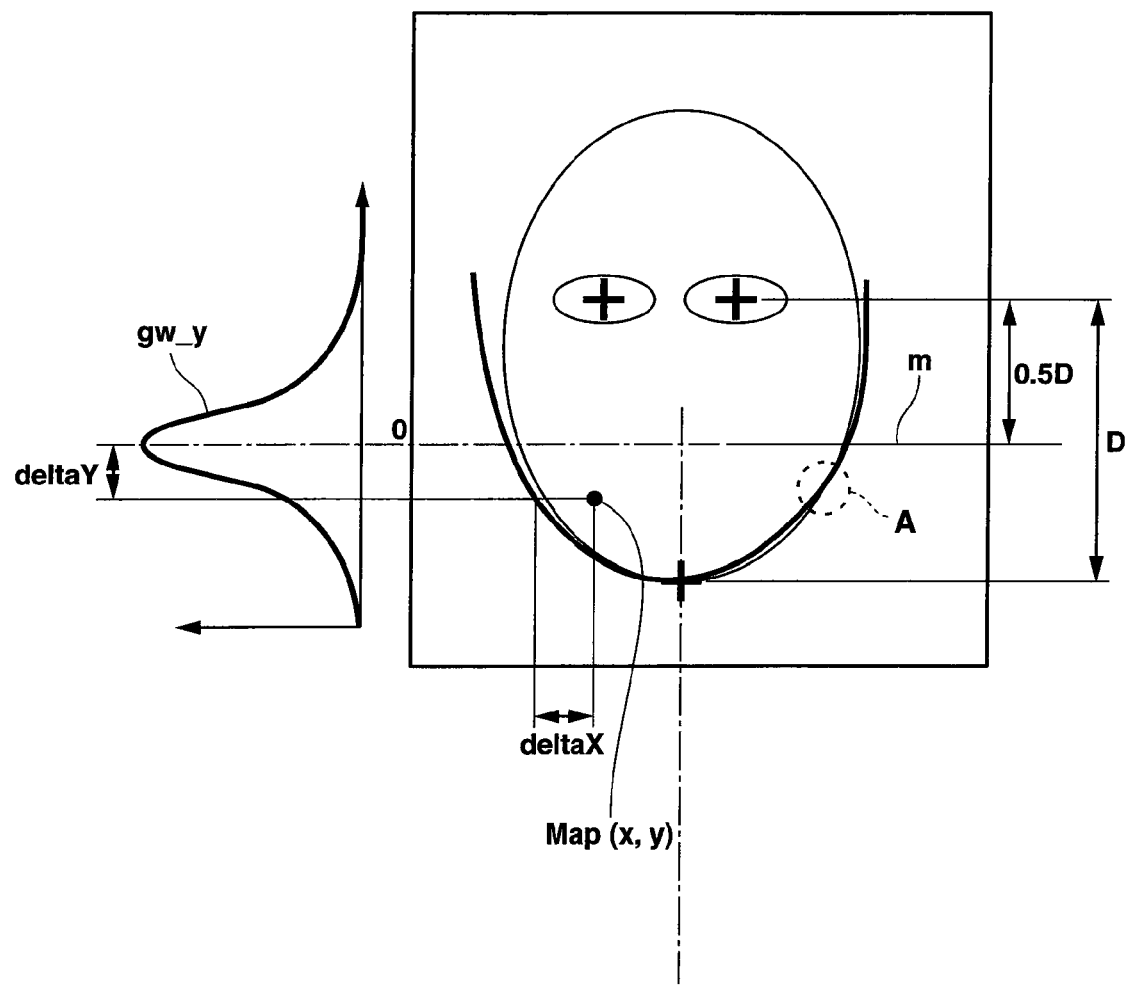
FIG. 5 is a view for explaining an example of the image processing.

The moving-distance map generator 4d calculates distance deltaX from the pseudo outline L1 in x direction based on expression (4) for each pixel in the face image. Then, the moving-distance map generator 4d calculates x-axis coefficient "gw_x" for each pixel from expression (5) based on the calculated distance "deltaX" and variance σX of Gaussian distribution (see FIG. 5).

$$\text{delta} = \left| \text{sqrt} \frac{\begin{array}{l}(w-wcx)*\cos\theta + \\ \frac{(y-wcy)*\sin\theta}{b}\end{array} * \begin{array}{l}(x-wcx)*\cos\theta + \\ \frac{(y-wcy)*\sin\theta}{b}\end{array} +}{\begin{array}{l}-(x-wcx)*\sin\theta + \\ \frac{(y-wcy)*\cos\theta}{a}\end{array} * \begin{array}{l}-(x-wcx)*\sin\theta + \\ \frac{(y-wcy)*\cos\theta}{a}\end{array} - 1} \right| \quad (4)$$

$$gw\_x = \exp(-0.5 * deltaX^2 / 2\sigma X^2) \quad (5)$$

where, $\sigma X \propto dis\_lr\_eye * kx$

The variance σX is proportional to a product of the distance dis_lr_eye and an adjustment coefficient kx. The variance σX is varied in dependence upon the distance dis_lr_eye between the eyes. Therefore, the x-axis coefficient "gw_x" can be automatically adjusted depending on the distance dis_lr_eye, i.e., the size of the face.

The adjustment coefficient kx may be set based on an image correction level or magnitude (described later) which is input in response to an operation made by a user with the operation input device 8.

In addition, the moving-distance map generator 4d calculates distance deltaY from a middle line m which passes a chin to a middle position between the eyes in y direction for each pixel. Then, the moving-distance map generator 4d calculates y-axis coefficient "gw_y" for each pixel from expression (6) based on the calculated distance "deltaY" and variance σY of Gaussian distribution (see FIG. 5).

$$gw\_y = \exp(-0.5 * deltaY^2 / 2\sigma Y^2) \quad (6)$$

where, $\sigma Y \propto dis\_lr\_eye * ky$

The variance σY is proportional to a product of the distance dis_lr_eye and an adjustment coefficient ky. The variance σY is varied in dependence upon distance dis_lr_eye between the eyes. Therefore, the y-axis coefficient "gw_y" can be automatically adjusted depending on the distance dis_lr_eye, i.e., the size of the face.

The adjustment coefficient ky may be set based on an image correction level or magnitude (described later) which is input in response to an operation made by a user with the operation input device 8.

The moving-distance map generator 4d defines a moving distance in x direction for each pixel depending on the x-axis coefficient gw_x and the y-axis coefficient gw_y, namely, depending on the distance deltaX from the pseudo outline L1 in x direction and the distance deltaY from the middle line m in y direction. A pixel which is more distant from the pseudo counter L1 in x direction is set to be moved by a shorter distance (see FIGS. 5 and 6), and a pixel which is more distant from the middle line m in y direction is set to be moved by a shorter distance.

Moreover, the moving-distance map generator 4d generates the moving-distance map, map (x, y), in dependence upon a position in x direction for each pixel with respect to coordinates (wcx, wcy) of the middle point between the right and left eyes.

When an x coordinate of an pixel is larger than the x coordinate wcx of the middle point between the eyes (x>wcx), that is, when the pixel is associated with the left side of the face, the moving-distance map generator 4d calculates an x component of map (x, y) from expression (7) shown below. The moving-distance map generator 4d derives the x component of map (x, y) by subtracting a product of the x-axis coefficient gw_x and the y-axis coefficient gw_y from the x coordinate of the pixel. On the other hand, when the x coordinate of the pixel is smaller than the x coordinate wcx of the middle point (x<wcx), that is, when the pixel is associated with the right side of the face, the moving-distance map generator 4d calculates the x component of map (x, y) from expression (8) shown below. The moving-distance map generator 4d derives the x component of map (x, y) by adding the product of the x-axis coefficient gw_x and the y-axis coefficient gw_y to the x coordinate of the pixel.

$$map(x,y)=(x-gw\_x*gw\_y,0) \; [x>wcx] \quad (7)$$

$$map(x,y)=(x+gw\_x*gw\_y,0) \; [x<wcx] \quad (8)$$

When the x coordinate of the pixel is equal to the x coordinate wcx of the middle point, the x component of map (x, y) is not calculated. Alternatively, the moving distance map, map (x, y), may be generated so that the position of the pixel in the entered image is identical with the position of the pixel in the output image.

Since a pixel which is more distant from the pseudo outline L1 has a smaller value of x-axis coefficient gw_x, the moving-distance map generator 4d can generate the moving-distance map, map (x, y), so that a shorter moving-distance is assigned to a more distant pixel from the pseudo outline L1 in x direction.

Figure 6:
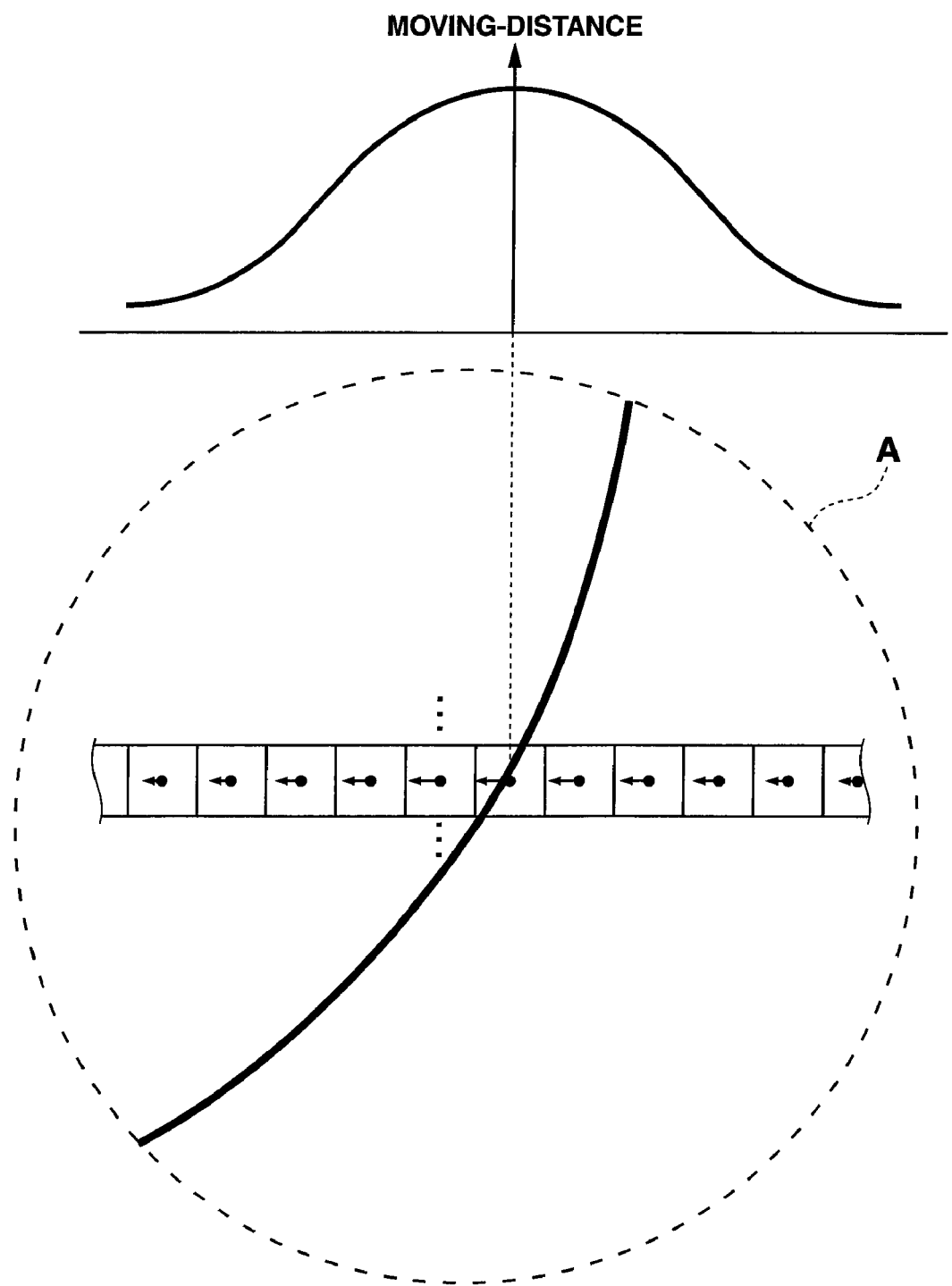
FIG. 6 is a view schematically showing moving distances for pixels in a part of a face.

In FIG. 6, moving distances of pixels in a portion A of the pseudo outline L1 representing a part of a left cheek and the vicinity thereof are schematically denoted by lengths and directions of arrows. A longer arrow denotes a larger moving distance.

The image processor 4 executes the warp processing on the pixels based on the moving distances defined by the moving-distance map (x, y) generated by the moving-distance map generator 4d. Thus, a pixel having a larger x coordinate value than the x coordinate wcx of the middle point between the eyes (i.e., x>wcx) is moved to the left by the moving distance in the warp processing. In addition, a pixel having a smaller x coordinate value than the x coordinate wcx of the middle point between the eyes (i.e., x<wcx) is moved to the right by the moving distance in the warp processing. Accordingly, the warp processing transforms the image of the face so that the portion below the eyes can be slimmed.

In the warp processing, the level of the transformation of the face image is varied in accordance with an image correction level set by an operation made by the user with the operation input device 8. The warp processing is herein described as an example to transform the image of the face; however, the invention is not so limited.

As described above, the CPU 11 and the image processor 4 functions as means for correcting the face image based on the pseudo outline L1.

The storage medium 5 includes a non-volatile memory (flash memory) and the like. The storage medium 5 stores image data which is encoded by a JPEG encoder in the image processor 4. In addition, the storage medium 5 stores image data which is subjected to image correction processing.

The display controller 7 reads image data which is temporarily stored in the data memory 9 to be displayed, and causes the display device 6 to display the read image data. The display controller 7 includes a VRAM, a VRAM controller and a digital video encoder. The digital video encoder periodically reads, via the VRAM controller, the luminance signal Y and the color difference signals Cb and Cr, which are read from the data memory 9 and stored in the VRAM under the control of the CPU 11. The digital video encoder generates a video signal based on the read signals and outputs the video signal to the display device 6.

The display device 6 displays an image which is captured by the electronic capture unit 2 based on the video signal sent from the display controller 7. In an image capture mode, the display device 6 sequentially displays the frames generated by the capturing controller 3 as a live-view image, and displays a REC-view image which is captured as an image to be recorded.

The operation input device 8 is used to enter an operation instruction into the image capture apparatus 100. The operation input device 8 includes a shutter button to give an instruction to capture an image, a menu button to give an instruction to display a menu screen which is associated with function selection and display setting, a selection button to give an instruction to select an operation mode and to set the selected mode, and a zoom button to give an instruction to adjust a zoom magnitude. The operation input device 8 outputs an operation signal to the CPU 11 in response to an operation made by the buttons.

The selection button is operated to enter a setting instruction for an image correction level (or processing magnitude; from level 1 to level 3, for example) on the menu screen which is displayed in response to the operation made by the menu button. The operation input device 8 outputs a setting signal to the CPU 11 in response to the operation.

The CPU 11 sets the image correction level in accordance with the entered setting signal.

The operation input device 8 and the CPU 11 function as means for setting the processing level of the image correction processing.

The CPU 11 controls the respective units in the image capture apparatus 100. That is, the CPU 11 controls the units in accordance with various programs for the image capture apparatus 100 stored in the program memory 10.

The data memory 9 includes, for example, a flash memory or the like and temporarily stores data to be processed by the CPU 11.

The program memory 10 stores various programs and data required for the CPU 11 to operate.

A program stored in the program memory 10 includes a face detection control routine, an eye detection control routine, an outline generation control routine and a correction control routine.

The term routine means a set of instructions which constitute a part of a computer program and realize a certain function.

The face detection control routine includes a set of instructions which cause the CPU 11 to realize a function for making the face detector 4a detect a characteristic part (face part) such as an eye, a nose, or a mouth from the frame generated by the electronic capture unit 2, and detect a face.

The eye detection control routine includes a set of instructions which cause the CPU 11 to realize a function for making the eye detector 4b detect eyes in the face which are detected by the face detector 4a.

The outline generation control routine includes a set of instructions for causing the CPU 11 to realize a function for making the outline generator 4c generate a pseudo outline L1 of the face based on the characteristic parts such as the eyes of the face detected by the face detector 4a. According to the outline generation control routine, the CPU 11 causes the outline generator 4c to calculate an inclination angle of the face and a distance between the eyes based on the positions of the eyes detected by the eye detector 4b. In addition, the CPU 11 causes the outline generator 4c to generate the pseudo outline L1 of the face based on the calculation result.

The correction control routine includes a set of instructions for causing the CPU 11 to realize a function for making the image processor 4 execute correction processing on the face image based on the pseudo outline L1 generated by the outline generator 4c. In accordance with the correction control routine, the CPU 11 causes the image processor 4 to execute the warp processing to transform the face image based on the pseudo outline L1. That is, the CPU 11 causes the moving-distance map generator 4d to calculate a distance from the pseudo outline L1 for each pixel in the face image, and causes the moving-distance map generator 4d to generate a moving-distance map, which defines a moving distance for each pixel, based on the calculated distance. Then, the CPU 11 causes the image processor 4 to execute the warp processing on the face image based on the moving-distance given from the moving-distance map.

Then, image correction processing according to an image correction method executed by the image capture apparatus 100 will be described with reference to FIG. 7.

Figure 7:
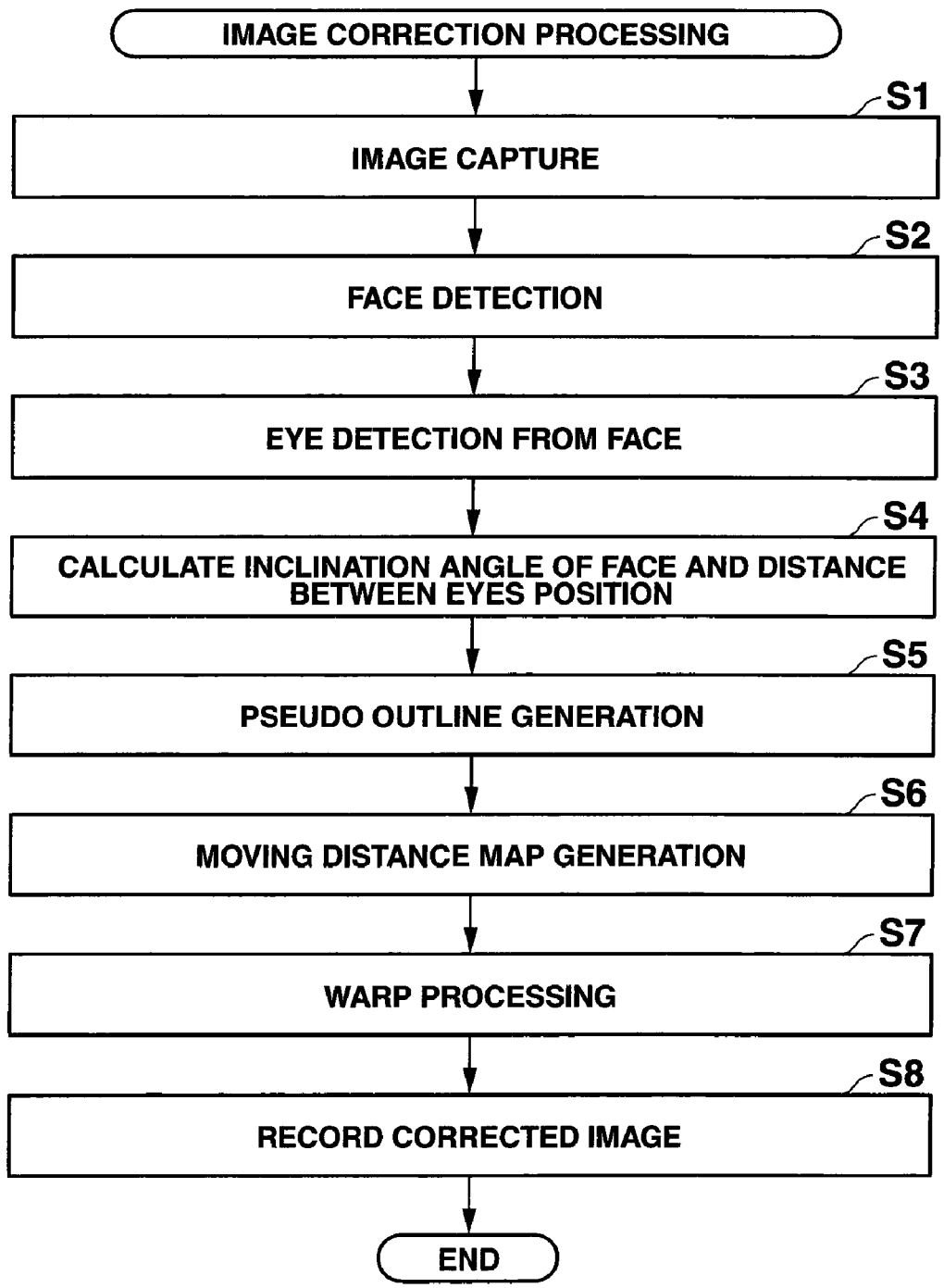
FIG. 7 is a flowchart of the image correction processing.

FIG. 7 is a flowchart showing an operation example according to the image correction processing.

The image correction processing is executed in response to an operation which is made by the user with the operation input device 8 to select an image correction mode on the menu screen.

As shown in FIG. 7, in response to a predetermined operation made by the user with the shutter button in the operation input device 8, the CPU 11 causes the capturing controller 3 to adjust a focus condition, an exposure condition and a white balance, and causes the electronic capture unit 2 to capture the face image as the subject (step S1). Thus, the capturing controller 3 reads a frame of the face image from the image-capture range of the electronic capture unit 2 and outputs the frame to the image processor 4.

In accordance with the face detection control routine, the CPU 11 causes the face detector 4a to detect the characteristic parts such as the eyes, nose, or mouth from the frame of the face image, and to detect the face based on the characteristic parts (step S2).

Then, in accordance with the eye detection control routine, the CPU 11 causes the eye detector 4b to detect the coordinates (rightEyeX, rightEyeY) and (leftEyeX, leftEye Y) of the centers of the right and left eyes in the face detected by the face detector 4a (step S3).

In accordance with the outline generation control routine, the CPU 11 causes the outline generator 4c to calculate the inclination angle $\theta$ of the face toward the x axis based on the absolute values of the distance "delta_x (=rightEyeX−leftEyeX)" between the eyes in x direction and the distance "delta_y (=rightEyeY−leftEyeY)" between the eyes in y direction using the expression (1) and causes the outline generator 4c to calculate the distance between the eyes dis_lr_eye based on the delta_x and delta_y using the expression (2) (step S4).

$$\theta = \arctan(\text{abs}(\text{delta}\_x), \text{abs}(\text{delta}\_y)) \tag{1}$$

$$\text{dis\_lr\_eye} = \sqrt{\text{delta}\_x^2 + \text{delta}\_y^2} \tag{2}$$

The CPU 11 causes the outline generator 4c to generate the pseudo outline L1 based on the coordinates (wcx, wcy) of the center point between the eyes, the inclination angle $\theta$ of the face, and the distance dis_lr_eye between the eyes using the expression (3) (step S5).

$$L1 = \frac{(w-wcx)*\cos\theta + (y-wcy)*\sin\theta}{b} * \frac{(x-wcx)*\cos\theta + (y-wcy)*\sin\theta}{b} + \frac{-(x-wcx)*\sin\theta + (y-wcy)*\cos\theta}{a} * \frac{-(x-wcx)*\sin\theta + (y-wcy)*\cos\theta}{a} \quad (3)$$

In accordance with the correction control routine, the CPU 11 causes the moving-distance map generator 4d to calculate a distance from the pseudo outline L1 for each pixel in the face image, and causes the moving-distance map generator 4d to generate the moving-distance map, i.e., map (x, y), which defines a moving-distance for each pixel based on the calculated distance from the pseudo outline L1 (step S6).

In specific, the CPU 11 causes the moving-distance map generator 4d to calculate a distance deltaX from the pseudo outline L1 in x direction based on the expression (4) for each pixel in the face image. Then the CPU 11 causes the moving-distance map generator 4d to calculate an x-axis coefficient gw_x, which is associated with the moving distance in x direction for each pixel, based on the distance deltaX in x direction and the variance σX of Gaussian distribution using the exponential function shown in the expression (5).

$$\text{delta} = \left| \text{sqrt} \frac{\frac{(w-wcx)*\cos\theta + (y-wcy)*\sin\theta}{b} * \frac{(x-wcx)*\cos\theta + (y-wcy)*\sin\theta}{b} + \frac{-(x-wcx)*\sin\theta + (y-wcy)*\cos\theta}{a} * \frac{-(w-wcx)*\sin\theta + (y-wcy)*\cos\theta}{a}}{} - 1 \right| \quad (4)$$

$$gw\_x = \exp(-0.5 * deltaX^2 / 2\sigma X^2) \quad (5)$$

where, $\sigma X \propto dis\_lr\_eye * kx$

Subsequently, the CPU 11 causes the moving-distance map generator 4d to calculate the distance deltaY in y direction from the middle line m which passes the middle position between the chin and the eyes. Then, the CPU 11 causes the moving-distance map generator 4d to calculate a y-axis coefficient gw_y, which is associated with the moving distance in y direction for each pixel, based on the distance deltaY in y direction and the variance σY of Gaussian distribution using the exponential function shown in the expression (6).

$$gw\_y = \exp(-0.5 * deltaY^2 / 2\sigma Y^2) \quad (6)$$

where, $\sigma Y \propto dis\_lr\_eye * ky$

When an x coordinate of a pixel is larger than the x coordinate wcx of the middle point between the eyes (x>wcx), the CPU 11 causes the moving-distance map generator 4d to calculate an x component of map (x, y) based on expression (7) by subtracting a product of the x-axis coefficient gw_x and the y-axis coefficient gw_y from the x coordinate of the pixel. On the other hand, when the x coordinate of the pixel is smaller than the x coordinate wcx of the middle point between the eyes (x<wcx), the CPU 11 causes the moving-distance map generator 4d to calculate the x component of map (x, y) based on expression (8) by adding the product of the x-axis coefficient gw_x and the y-axis coefficient gw_y to the x coordinate of the pixel.

$$map(x,y) = (x - gw\_x * gw\_y, 0) \quad [x>wcx] \quad (7)$$

$$map(x,y) = (x + gw\_x * gw\_y, 0) \quad [x<wcx] \quad (8)$$

The CPU 11 causes the image processor 4 to execute the warp processing on each pixel depending on the moving distance of the pixel defined by the moving distance map, map (x, y), to correct the face image in such a manner that a pixel having a larger x coordinate value than the x coordinate wcx of the middle point between the eyes (i.e., x>wcx) is moved to the left by the moving distance, and a pixel having a smaller x coordinate value than wcx (i.e., x<wcx) is moved to the right by the moving distance (step S7).

Then, the CPU 11 stores the image data of the image corrected by the warp processing into the storage medium 5 (step S8), and then, terminates the image correction processing.

As described above, according to the image capture apparatus 100 of the present embodiment, a characteristic part of a face in a face image captured by the electronic capture unit 2 is detected, and pseudo outline L1 of the face can be generated based on the characteristic part. In specific, position coordinates (rightEyeX, rightEyeY) and (leftEyeX, leftEyeY) of the eyes are detected. A face inclination angle θ and a distance dis_lr_eye between the right and left eyes are calculated based on the detected position coordinates (rightEyeX, rightEyeY) and (leftEyeX, leftEyeY). Then, based on the calculation result, a pseudo outline L1 of the face can be generated. Therefore, detection of the characteristic part in the face and calculation of the inclination angle θ of the face and the distance between the eyes dis_lr_eye can appropriately be executed. The pseudo outline L1 of the face can appropriately generated based on the characteristic part.

Thus, based on the generated pseudo outline L1, correction processing can be executed on the captured face image. That is, warp processing to transform the face image can be executed based on the pseudo outline L1 of the face. Specifically, distances between the pseudo outline L1 and pixels in the face image are calculated, and a moving-distance map, map (x, y), which defines moving distances for the pixels, are generated based on the calculated distances. The warp processing is executed on the face image in accordance with the moving distances given from the moving-distance map. Therefore, the correction processing can appropriately be executed on the face image based on the pseudo outline L1.

Accordingly, only by capturing an image of a face by the electronic capture unit 2, correction on the face image can be performed so that an outline below eyes in the face can be slimmed. Thus, the user does not need to make a special operation for image correction, and the image correction for the face image can readily executed.

A level of the image correction is set by a predetermined operation made by the user with the operation input unit 8. The correction processing is executed on the face image in dependence upon the image correction level. Thus, processing magnitude, that is, how much the face is slimmed, can be set to a level desired by the user, and the image capture apparatus 100 can be further useful.

The present invention is not limited to the above described embodiment. Various modifications and changes in design may be made without departing from the scope of the invention.

For example, whether to or not to execute the image correction processing may be determined based on a size of the face detected by the face detection. The pseudo outline L1 of the face may not necessarily be generated if the detected face does not fall within a predetermined area and the size of the face is larger or smaller than a predetermined value, or if the distance between the eyes is larger or smaller than a predetermined value. Thus, excessive image correction is not executed.

The moving-distance in x direction may be changed in dependence upon the size of the detected face. The moving-distance in x direction may be changed by changing the x-axis coefficient gw_x derived from the expression (5) by changing the adjustment coefficient kx, or by multiplying the x-axis coefficient gw_x by a predetermined coefficient, so that the moving-distance is more enlarged when larger face is detected. Thus, the image correction processing can appropriately be executed in consideration of the size of the face with respect to the image size.

In the above embodiment, the eyes are detected as the characteristic parts. However, the nose, mouth or eye brows may be detected as the characteristic part(s).

In the above embodiment, the pseudo outline L1 is generated on the basis of the positions of the eyes. However, the pseudo outline L1 may be generated on the basis of any characteristic part in the face. For example, the pseudo outline L1 may be generated on the basis of one or more of the positions of the nose, mouth and the like.

By generating the pseudo outline L1 on the basis of the positions of the nose, mouse and the like in addition to the eyes, more precise pseudo outline L1 can be generated. Thus, the image correction processing can be more appropriately executed.

In the above embodiment, the pseudo outline L1 is generated on the basis of the positions of the eyes. However, the pseudo outline L1 may be generated on the basis of the sizes of the eyes in addition to the positions of the eyes. That is, the eye detector 4b may calculate the sizes of the eyes as well as the positions of the eyes, and the pseudo outline L1 may be generated based on the positions and sizes of the eyes.

Consequently, more accurate pseudo outline L1 can be generated and the image correction processing can be more appropriately executed.

Figure 3B:
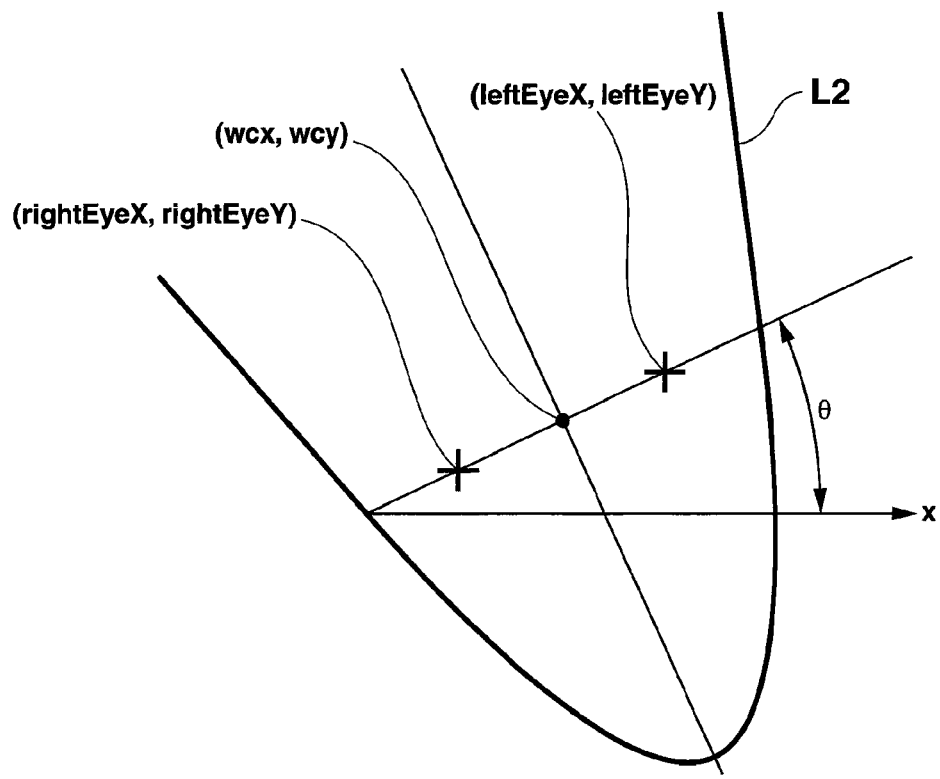

In the above embodiment, the shape of the pseudo outline L1 is assumed to be ellipse. However, the pseudo outline of the face is not limited to the ellipse shape. The pseudo outline L1 may be any curve that traces the outline of the face. For example, as shown in FIG. 3B, a parabolic pseudo outline L2 expressed by the expression $L2=ax^2+bx+c$ (wherein a, b and c are arbitrary numbers) may be generated. Similarly to the above embodiment, appropriate image correction can be executed on the face image using the pseudo outline L2.

In the above embodiment, image correction is executed so that the portion below the eyes is slimmed. However, the invention is not so limited. For example, if an x coordinate of a pixel is larger than the x coordinate of the middle point between the eyes (i.e., when x>wcx), an x component of map(x, y) may be calculated from the expression (8). As well, if an x coordinate of a pixel is smaller than the x coordinate of the center of the eyes, an x component of map (x, y) may be calculated from the expression (7). Thus, the image correction may be executed so that the portion below the eyes is widened.

Furthermore, an age of the subject person may be estimated, and the pseudo outline L1 may be generated in consideration of the estimated age. For example, since the positions of the eyes of a child are lower than the positions of the eyes of an adult, considering the age of the subject person allows more accurately generating the pseudo outline L1.

Moreover, the pseudo outline L1 of the face may be generated in view of sexuality or race of the subject person.

The correction processing may be executed on the live-view image, and a corrected image may be displayed as the live-view image. That is, the moving distance map, map (x, y) is generated and the sequentially entered live-view image is corrected based on map (x, y). The corrected image is displayed as the live-view image. Meanwhile, the user can operate the operation input device 8 to adjust the level of the image correction. The face image corrected in dependence upon the adjusted level of the image correction is displayed as the live-view image. Therefore, the user can view the face image corrected at the set level of the image correction, before recording the image. Thereafter, when the shutter button of the operation input device 8 is depressed, an image to be recorded is captured and the correction processing is executed at the image correction level set during the live-view display, and the image subjected to the correction is recorded in a storage medium.

The above configuration of the image capture apparatus 100 is illustrated by way of example, and the configuration of the image capture apparatus 100 is not limited to the illustrated example.

The image capture apparatus 100 is described as an example of the image processing apparatus. However, a different image processing apparatus may be utilized. The imaging lens unit 1, the electronic capture unit 2, and the capturing controller 3 may necessarily not be provided. The present invention can be applied to any image processing apparatus, which can acquire a face image, detect a characteristic part in the face image, generate a pseudo outline of a face based on the characteristic part, and execute correction processing on the face image based on the pseudo outline. For example, the present invention may be applied to a computer system such as a personal computer.

In the above embodiment, the face detection function, the characteristic part detection function, the outline generation function, and the image correction function are realized by the image processor 4 (face detector 4a, eye detector 4b, outline generator 4c and moving-distance map generator) under the control of the CPU 11. However, the invention is not so limited. The functions may be presented by the CPU 11 executing predetermined programs stored in a storage medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
an image capture unit configured to capture an image;
a characteristic part detector configured to detect a characteristic part of a face from the image captured by the image capture unit, the characteristic part comprising eyes, a nose, a mouth, or eyebrows;
an outline generator configured to generate a pseudo outline of the face based on positions of the characteristic part, comprising the eyes, nose, mouth, or eyebrows, detected by the characteristic part detector; and
a correction unit configured to correct the image based on the pseudo outline generated by the outline generator,
wherein the correction unit is configured to transform the image based on the pseudo outline, wherein the image processing apparatus further comprises:
a distance calculation unit configured to calculate a distance from the pseudo outline for each pixel in the image; and
a moving-distance defining unit configured to define a moving distance depending on the distance calculated by the distance calculation unit for each pixel, and wherein the correction unit is configured to transform the image based on the moving distance of each pixel.

2. The image processing apparatus according to claim 1, wherein the characteristic part detector detects both of a person's eyes as the characteristic part, and the outline generator generates the pseudo outline based on the positions of both of the eyes detected by the characteristic part detector.

3. The image processing apparatus according to claim 2, wherein the outline generator calculates an inclination angle of the face in the image and a distance between the eyes based on the positions of the eyes, and generates the pseudo outline based on the inclination angle and the distance between the eyes.

4. The image processing apparatus according to claim 1, further comprising a calculation unit configured to calculate a size of the characteristic part on the image, wherein the outline generator generates the pseudo outline based on the position and the size of the characteristic part.

5. The image processing apparatus according to claim 1, further comprising a setting unit configured to set a correcting level to correct the image, wherein the correction unit corrects the image at the correcting level set by the setting unit.

6. An image processing method comprising:
   capturing an image;
   detecting a characteristic part of a face from the image, the characteristic part comprising eyes, a nose, a mouth, or eyebrows;
   generating a pseudo outline of the face based on the characteristic part comprising the eyes, nose, mouth, or eyebrows; and
   correcting the image based on the pseudo outline,
   wherein the correcting comprises transforming the image based on the pseudo outline,
   wherein the method further comprises:
      calculating a distance from the pseudo outline for each pixel in the image; and
      defining a moving distance depending on the distance calculated for each pixel, and
   wherein the correcting comprises transforming the image based on the moving distance of each pixel.

7. A non-transitory computer-readable storage medium having stored thereon a computer readable program which causes a computer which comprises an image capture unit configured to capture an image to perform functions comprising:
   detecting a characteristic part of a face from the image, the characteristic part comprising eyes, a nose, a mouth, or eyebrows;
   generating a pseudo outline of the face based on the characteristic part comprising the eyes, nose, mouth, or eyebrows; and
   correcting the image based on the pseudo outline,
   wherein the correcting comprises transforming the image based on the pseudo outline,
   wherein the functions further comprise:
      calculating a distance from the pseudo outline for each pixel in the image; and
      defining a moving distance depending on the distance calculated for each pixel, and
   wherein the correcting comprises transforming the image based on the moving distance of each pixel.

8. The image processing apparatus according to claim 1, wherein the outline generator is configured to calculate, based on the positions of characteristic parts comprising the eyes, nose, mouth, or eyebrows detected by the characteristic part detector, an inclination angle of the face and distances between the characteristic parts, and to generate the pseudo outline of the face with an inclination angle and a size which correspond to the calculated inclination angle and the distances.

9. The image processing apparatus according to claim 1, wherein the moving-distance defining unit is configured to define the moving distance for each pixel such that the moving distance decreases in accordance with an increase of the distance calculated by the distance calculation unit.

10. The image processing apparatus according to claim 9, wherein the moving-distance defining unit is configured to define a moving distance to the right for a pixel at a right side of a center of the face calculated based on the positions of the characteristic part and to define a moving distance to the left for a pixel at a left side of the center of the face.

11. The image processing apparatus according to claim 9, wherein the distance calculation unit is configured to calculate a lateral distance with respect to the pseudo outline for each pixel in the image,
   wherein the image processing apparatus further comprises a longitudinal distance calculation unit configured to calculate a longitudinal distance with respect to a middle position between a chin and the eyes, and
   wherein the moving-distance defining unit is configured to define a moving distance for a pixel such that the lateral distance decreases in accordance with an increase of the longitudinal distance calculated by the longitudinal distance calculation unit and an increase of the lateral distance calculated by the longitudinal distance calculation unit.

12. The image processing apparatus according to claim 10, wherein the distance calculation unit is configured to calculate a lateral distance with respect to the pseudo outline for each pixel in the image,
   wherein the image processing apparatus further comprises a longitudinal distance calculation unit configured to calculate a longitudinal distance with respect to a middle position between a chin and the eyes, and
   wherein the moving-distance defining unit is configured to define a moving distance for a pixel such that the lateral distance decreases in accordance with an increase of the longitudinal distance calculated by the longitudinal distance calculation unit and an increase of the lateral distance calculated by the longitudinal distance calculation unit.

* * * * *